United States Patent Office 3,084,426
Patented Apr. 9, 1963

3,084,426
METHOD OF MACHINING METAL PARTS
Jiří Hugo, Eduard Köllner, František Novák, and Bruno Schreiber, all of Prague, Czechoslovakia, assignors to Státní vyzkumny ustav materiálu a technologie, Prague, Czechoslovakia
No Drawing. Filed July 27, 1960, Ser. No. 45,523
Claims priority, application Czechoslovakia July 30, 1959
3 Claims. (Cl. 29—418)

The present invention relates to a method of machining metal parts.

According to known methods metal parts which are to be machined are fixed in chucks of machine tools, for instance, in disc-shaped jaws, in clamping devices by means of various clamping members, and the like. This fixing method is, however, unsuitable for the production of precision parts because the clamping forces to which they are subjected cause their deformation and thereby a lack of precision in the machined surfaces.

Another method of fixing such parts has therefore been devised, in which the part which is to be machined is soldered to another part by means of low melting alloys. When this method is applied it is, however, necessary to clean the two parts with chemical substances prior to the soldering operation. However, during this process vapors develop due to decomposition of such cleaning substances, which vapors are objectionable for various reasons.

The known methods of fixing parts which are to be machined have thus various drawbacks which either result in an inaccurate shape of the machined part or render the methods exceedingly tedious or unsuitable due to the presence of undesirable vapors.

The present invention deals effectively with the problem of fixing parts which are to be machined on clamping supports in a simple, rapid and technologically advantageous manner as to cause no undesirable deformations which would interfere with accurate machining.

The foregoing objects of the invention and such objects as will appear from the following description are achieved, according to our invention, by providing a layer of thermoplastic material between faces of a metal part to be machined and an auxiliary part, subjecting the resultant body to pressure at a temperature above the softening point of the thermoplastic material used, allowing the bonded body to cool, realeasing the pressure, fixing the auxiliary part in the machine tool, machining the metal part, and separating the machined metal part from the auxiliary part. The separation is caused by applying heat or a solvent for the thermoplastic material used.

Experiments have shown such a precision of the machined shape that deviations have not exceeded $1\mu$. Foils having, for instance, a thickness of 0.1 to 0.4 mm. and consisting of polyvinylbutyral, polyvinylformal, plasticzed polyvinylalcohol, and other substances with similar properties have proved most suitable for the purposes of the invention.

The following are examples of carrying out the new method:

*Example 1*

A suitably cut foil of a thermoplastic material of a thickness of 0.1 to 0.4 mm. is placed between a part which has to be machined and an auxiliary part, which have been heated to a temperature of 100–200° C. The two parts are bonded together by slight pressure, whereupon the bonded body is allowed to cool and the pressure is released. The auxiliary part is then mechanically clamped in a machine tool, and the metal part is machined. After machining, the machined part is separated from the auxiliary part by heating to 100° to 200° C. or by means of a mixture of methanol and trichlorethylene which causes a swelling of the foil.

*Example 2*

A thermoplastic foil is interposed between the part which has to be machined and the auxiliary part. The two parts are pressed against one another under slight pressure and joined by heating in any suitable way to 100 to 200° C., such as radiation heating, dielectric or induction heating and the like. The process is continued as indicated in Example 1.

It will be appreciated from the foregoing disclosure that the method of the invention proceeds with high speed, is unobjectionable from the hygienic point of view, and meets the highest requirements as to precision of the machined shape. Because of its simplicity and reliability it is particularly suitable for series production.

We claim:

1. A method of machining metal parts with high accuracy, comprising providing a layer of thermoplastic material between faces of the metal part to be machined and an auxiliary part, heating the resultant body to a temperature above the softening point of the thermoplastic material used, applying oppositely directed pressures to bond said metal and auxiliary parts together, while said thermoplastic material is in condition of plasticity, allowing the bonded body thus obtained to cool, releasing the pressures, fixing said auxiliary part in a machine tool, machining the metal part, said fixing and machining being done with said bonded body still intact, and breaking up said bonded body, thereby obtaining a machined metal part free of any fixing of clamping damages.

2. In the method according to claim 1, placing a vinyl polymer sheet as said thermoplastic material between said faces, and heating to a temperature of approximately 100° to 200° C.

3. In the method according to claim 1, placing a sheet of a vinyl resin as said thermoplastic material between said faces, and heating to a temperature of approximately 100° to 200° C., the vinyl resin being selected from a group consisting of polyvinyl butyral, polyvinyl formal, and plasticized polyvinyl alcohol.

References Cited in the file of this patent

UNITED STATES PATENTS

| | | |
|---|---|---|
| 2,180,872 | Ford | Nov. 21, 1939 |
| 2,280,981 | Schuh | Apr. 28, 1942 |
| 2,318,095 | Putman | May 4, 1943 |
| 2,328,302 | Simison | Aug. 31, 1943 |
| 2,614,953 | Anglada | Oct. 21, 1952 |
| 2,614,954 | Ewing et al. | Oct. 21, 1952 |
| 2,762,954 | Leifer | Sept. 11, 1956 |
| 2,867,560 | Strawinski | Jan. 6, 1959 |
| 2,968,866 | Soper et al. | Jan. 24, 1961 |